July 12, 1949.  K. J. KNUDSEN  2,476,099

RESISTANCE THERMOMETER BULB

Filed Feb. 26, 1947

INVENTOR.
Knud J. Knudsen
BY
Johnson, Kline and Hensel
ATTORNEYS

Patented July 12, 1949

2,476,099

UNITED STATES PATENT OFFICE 2,476,099

RESISTANCE THERMOMETER BULB

Knud J. Knudsen, Naugatuck, Conn., assignor to The Lewis Engineering Company, Naugatuck, Conn., a corporation of Connecticut Application February 26, 1947, Serial No. 731,089

13 Claims. (Cl. 201—63)

This invention relates to resistance thermometer bulbs.

An object of the invention is to provide an improved and simplified resistance thermometer bulb which is of extremely rugged construction, and is reliable in operation under severe conditions of use.

A further object of the invention is to provide an improved resistance thermometer bulb, the operative parts of which are securely hermetically sealed in, as well as being mechanically protected against damage.

Another object of the invention is to provide a resistance thermometer bulb as above which is small and compact, not requiring additional space beyond that ordinarily allotted such units.

In accomplishing these objects there is provided, according to the invention and in the specific embodiments illustrated as exemplary thereof, a bulb unit comprising a copper bobbin on which a heat-responsive coil is wound. Secured in the bobbin and extending from one end thereof is a rigid stud having insulated sides. On the stud a calibrating coil of constantan is wound, and also metal connector clips are secured in axially spaced relationship, said clips being connected with the coils, which are joined to each other in a series circuit. This assemblage is enclosed in a metal sleeve, one end of which is securely joined to the copper bobbin. From the metal connector clips leads are brought out through the metal sleeve for connection in an electrical circuit.

By the use of the rigid stud securely anchored in the copper bobbin and carrying the calibrating coil and connector clips, an extremely rugged structure is provided which is proof against vibration and mechanical shock and has been found to possess an extremely long, useful life.

In one of the specific embodiments of the invention the copper bobbin is hermetically sealed to the end of the sleeve to which it is joined, and the leads extending from the other end of the sleeve are hermetically sealed thereto by being passed through glass beads which are sealed in apertures of a metal cap secured and sealed to the sleeve. The metal sleeve is in turn secured in a threaded mounting head, one end of which is sealed to the sleeve intermediate the ends of the latter. By this construction, a completely sealed unit is provided which is proof against moisture, oil and other foreign matter as well as severe mechanical vibration, and one which is therefore extremely reliable over a long period of use.

In another embodiment of the invention, the metal sleeve is crimped to the end of the copper bobbin, and the other end of the sleeve through which the leads extend carries a bayonet-type fitting or head by which the sleeve may be secured in the well of a supporting structure.

Due to the rigid supporting structure for the calibrating coil and connector clips, comprising the stud rigidly secured in the copper bobbin, an extremely rugged unit is provided regardless of whether or not the unit is hermetically sealed.

Other features and advantages will hereinafter appear.

Figure 1:
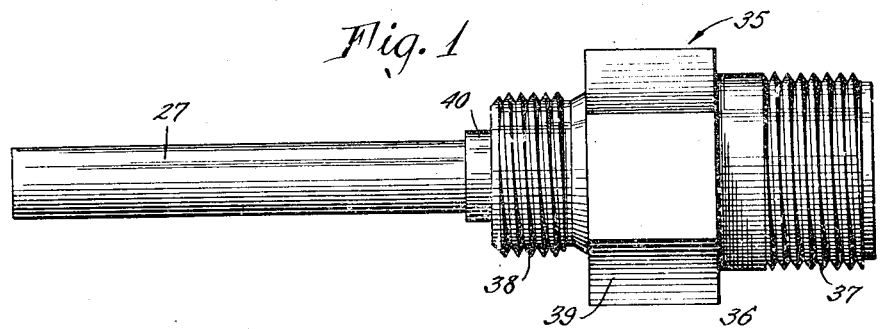
Figure 1 is a side view of a resistance thermometer bulb of the hermetically sealed type, made in accordance with the invention.
Figure 2:
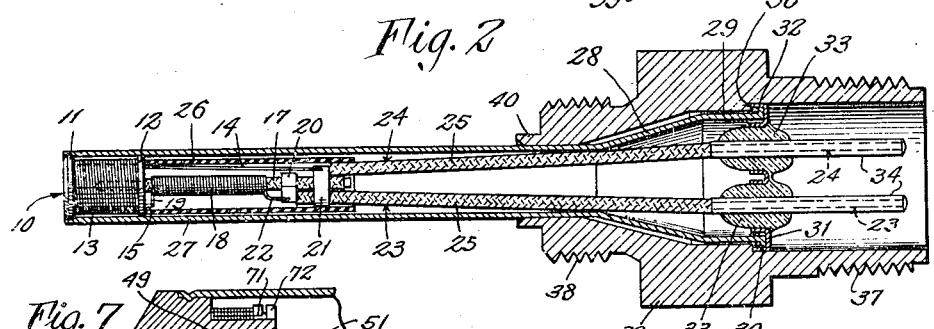
Fig. 2 is an axial section, taken through the bulb of Fig. 1.
Figure 5:
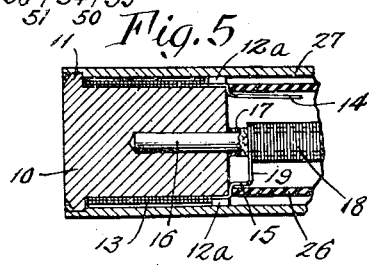
Fig. 5 is an enlarged axial section of the tip portion only of the resistance bulb of Figs. 1 and 2.

Referring to Figs. 1, 2 and 5, the hermetically sealed resistance thermometer bulb shown therein comprises a copper bobbin 10 which is generally cylindrical and has peripheral flanges 11 and 12 at its ends respectively, the bobbin intermediate the flanges being wound with a heat-responsive coil 13, which by way of example may be of nickel wire. As shown in Fig. 5, the two ends 14 and 15 of the coil 13 may be brought out axially of the bobbin through notches 12a in the bobbin flange 12.

In accordance with the invention a rigid stud 16 is provided, at one end firmly embedded in the bobbin 10 as by a press fit, the stud extending axially from the bobbin and carrying an insulating sleeve 17 which extends for substantially the entire exposed length of the stud. The stud 16 may be formed of any suitable material, it being preferably of stainless steel which is corrosion resistant and not a particularly good conductor of heat.

Adjacent the bobbin 10 a calibrating coil 18, which may be of constantan wire, is wound on the insulating sleeve 17, one end 19 of the coil 18 being joined to the end 15 of the heat-responsive coil 13.

The calibrating coil 18 does not cover the entire exposed length of the sleeve 17, and on the remainder of the sleeve a pair of metal clips 20 and 21 are secured, the clip 20 being placed between the clip 21 and the coil 18, and being connected with the remaining end 22 of the said coil.

As shown in Fig. 2 the remaining end 14 of the heat-responsive coil 13 is connected with the connector clip 21 and both connector clips are respectively connected with lead wires 23 and 24 covered by treated glass spaghetti 25, the said wires extending in a generally axial direction away from the stud 16 and bobbin 10.

It will be noted that the connector clip 21 to which the lead wire 24 is joined also encompasses the lead wire 23 and spaghetti covering 25 thereof and secures these mechanically to the insulating sleeve 17 on the stud 16.

Surrounding the calibrating coil 18 and connector clips 20 and 21 an insulating sleeve 26, preferably of fibreglass is provided.

The above assemblage is inserted in a metal protective sleeve 27 which is preferably of stainless steel, one end of the sleeve 27 being secured to the exterior end of the bobbin 10 by silver solder, which thus hermetically seals the end of the sleeve 27. As shown in Fig. 2, the sleeve 27 has a fairly substantial length and surrounds not only the fibreglass insulating sleeve 26, but also a considerable length of the lead wires 23 and 24. At its other end the sleeve 27 is enlarged, having a conical or tapering portion 28 and a cylindrical portion 29 which latter terminates in an out-turned peripheral flange 30. Secured to the enlarged end of the sleeve 27 is a disklike metal cap 31 which is preferably formed of a material such as Kovar which has a thermal expansion similar to that of glass. The periphery of the cap 31 has an annular flange 32 of a size just large enough to receive the out-turned flange 30 of the metal sleeve 27, and the latter is inserted in the cap as shown in Fig. 2 and silver soldered thereto to provide a hermetic seal.

The cap 31 has a pair of apertures in it, formed by piercing and extruding the metal, and in said apertures a pair of glass beads 33 is hermetically sealed, the said beads having hollow contact pins 34, also of Kovar, extending through them and sealed to them. The lead wires 23 and 24 coming from the connector clips 20 and 21 extend through the contact pins 34 and are silver soldered to the tips of the pins so as to be hermetically sealed thereto.

It will be seen that by the above construction a completely hermetically sealed, resistance bulb unit is provided, and one which is extremely rugged in construction and reliable in operation, while at the same time retaining simplicity and compactness.

For the purpose of mounting the bulb in a supporting structure, a hexagonal mounting head 35 is provided, having a bore adapted to receive the sleeve 27 and enlarged end portions 28 and 29 thereof, and having an internal shoulder 36 for engagement with the peripheral flange 32 of the sealing cap 31. The head 35 has external threads 37 and 38 respectively at its opposite ends, and intermediate said threads has a hexagonal body 39 for engagement by a wrench. At one end 40 of the head 35 the latter is secured to the sleeve 29 as by silver soldering, thereby to hermetically seal the head to the sleeve.

In mounting the resistance thermometer bulb in a support- and heat-imparting structure, the projecting portion of the sleeve 27 is inserted in a well in said structure and the head 35 secured to the structure by engagement of the threads 38 with internal threads of the well of the structure. The external threads 37 of the mounting head are provided for engagement with a cable fitting by means of which connection is made to the pins 34 and thence to the coils 13 and 18.

Figure 3:
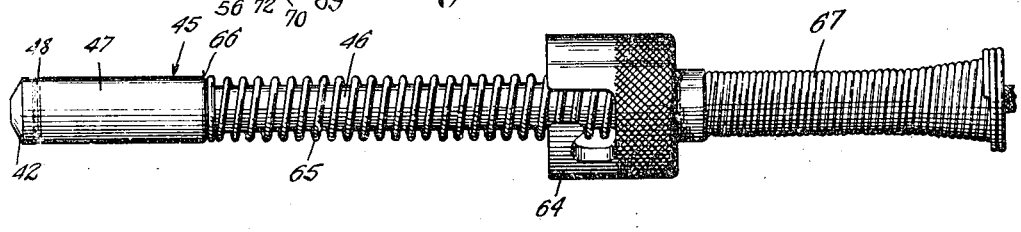
Fig. 3 is a side view of a resistance thermometer bulb of the unsealed type, made in accordance with the present invention.
Figure 4:
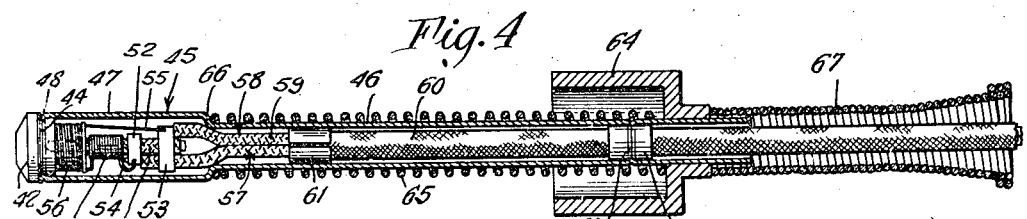
Fig. 4 is an axial section taken through the bulb of Fig. 3.
Figure 6:
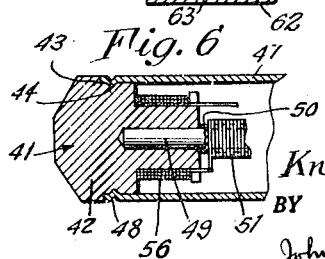
Fig. 6 is an enlarged axial section of the tip portion only of the bulb of Figs. 3 and 4.

A non-sealing type of resistance thermometer bulb made in accordance with the invention is shown in Figs. 3, 4 and 6. Referring to the latter figure, a copper bobbin 41 is provided, having an enlarged head 42 at one end thereof, the head having an annular shoulder 43 and adjacent the latter an annular groove 44. A metal protecting and supporting sleeve 45 is provided, having an elongate shank portion 46 of relatively small diameter and an enlarged head portion 47, the forward end 48 of which is crimped in the annular groove 44 of the bobbin head 42 and abuts the shoulder 43 thereof.

A rigid stud 49 is press-fitted in the bobbin 41 and extends axially from the inner end thereof, the stud carrying an insulating sleeve 50 on which is wound a calibrating coil 51 of constantan or other suitable wire. The insulating sleeve 50 on the stud 49 also carries a pair of metal connector clips 52 and 53, the clip 52 being joined to one end 54 of the coil 51, and the clip 53 being joined to one end 55 of a heat-responsive coil 56 carried on the bobbin 41. The other ends of the coils 51 and 56 are connected together.

Lead wires 57 and 58 covered with treated glass spaghetti 59 are connected respectively to the connector clips 52 and 53, the latter clip also encircling and securing the lead wire 57 to the insulating sleeve 50.

The lead wires 57 and 58 are brought through an insulating sleeve 60 which carries a pair of split metal rings 61 and 62 engaging the interior of the shank portion 46 of the sleeve 45, the latter ring having an external annular groove 63 into which the sleeve portion 46 is crimped as shown in Fig. 4.

For the purpose of quickly and conveniently securing the resistance bulb to a supporting and heat-imparting structure, a bayonet fitting 64 is provided, axially slidable on the sleeve portion 46, and a compression coil spring 65 is carried by the sleeve portion for engagement with the bayonet fitting 64 and a shoulder 66 located between the sleeve portions 46 and 47, the spring 65 serving to hold the bobbin head 42 in contact with a surface from which heat is to be transmitted.

A coil-wire guard or sheath 67 is provided, secured to the end of the sleeve portion 46 and extending axially therefrom for protection of the lead wires carried in the insulating sleeve 60.

Figure 7:
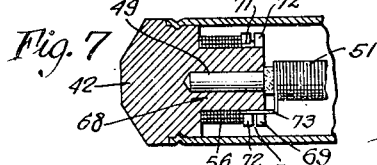
Fig. 7 is an enlarged axial section of the tip portion of a resistance thermometer bulb made in accordance with a modification of the invention.

A modification of the invention is shown in Fig. 7. According to the construction shown herein the bobbin 68 which carries the heat-responsive coil 56 is provided at one end with an annular flange 69 having a circumferential groove 70 therein. One end 71 of the coil 56 is brought out through one of a pair of notches 72 in the flange 69 and placed in the groove 70 thereof, whereupon the outer portion of the flange is deformed inward so as to seize the wire end 71. The other end 73 of the wire is connected with the calibrating coil 51 as above described.

By this construction the bobbin 68 and metal sleeve 45 are included in the circuit with the coils 51 and 56, and electrical connection to the latter coil may be made through the sleeve 45, which acts as a ground.

Variations and modifications may be made within the scope of this invention and portions of the improvements may be used without others.

I claim:

1. A resistance thermometer bulb comprising a metal bobbin of high heat conductivity, adapted to engage a heat-transmitting body; an electrically insulated heat-responsive coil on said bobbin; a rigid stud extending generally axially from one end of the bobbin; an electrically insulated calibrating coil wound on the stud and series-connected to the heat-responsive coil; a pair of metal connector clips secured to the stud in insulated relation; a pair of lead wires respectively connected to the clips; and connections between said clips and the calibrating and heat-responsive coils.

2. A resistance thermometer bulb comprising a metal bobbin of high heat conductivity; an electrically insulated heat-responsive coil on said bobbin; a rigid stud extending generally axially from one end of the bobbin; an electrically insulated calibrating coil wound on the stud and series-connected to the heat-responsive coil; a pair of metal connector clips secured to the stud in insulated relation; connections between said clips and the calibrating and heat-responsive coils; and a pair of lead wires connected respectively to the metal clips, one of the said wires being secured to said stud for anchorage purposes by the clip to which the other wire is connected.

3. A resistance thermometer bulb comprising a metal bobbin of high heat conductivity, said bobbin having an axially extended and diametrically enlarged head at one end thereof; an electrically insulated heat-responsive coil on said bobbin; a rigid stud extending generally axially from the other end of the bobbin; an electrically insulated calibrating coil wound on the stud and series connected to the heat-responsive coil; a pair of metal connector clips secured to the stud in insulated relation; connections between said clips and the calibrating and heat-responsive coils; and a metal sleeve surrounding the bobbin and coils, the end of said sleeve being secured to the enlarged head of the bobbin.

4. A resistance thermometer bulb comprising a metal bobbin of high heat conductivity, said bobbin having an axially extended and diametrically enlarged head at one end thereof, and said head having a circumferential shoulder and an annular groove in its periphery adjacent said shoulder; an electrically insulated heat-responsive coil on said bobbin; a rigid stud extending generally axially from the other end of the bobbin; an electrically insulated calibrating coil wound on the stud and series-connected to the heat-responsive coil; a pair of metal connector clips secured to the stud in insulated relation; connections between said clips and the calibrating and heat-responsive coils; and a metal sleeve surrounding the bobbin and coils, the end of said sleeve being crimped in the groove of the enlarged bobbin head and the end of the sleeve abutting the circumferential shoulder of said head.

5. A resistance thermometer bulb comprising a metal bobbin of high heat conductivity; an electrically insulated heat-responsive coil on said bobbin; a rigid stud extending generally axially from one end of the bobbin; an electrically insulated calibrating coil wound on the stud; a pair of metal connector clips secured to the stud in insulated relation; connections between said clips and the calibrating and heat-responsive coils; a pair of lead wires connected respectively to the metal clips, one of the said wires being secured to said stud for anchorage purposes by the clip to which the other wire is connected; an insulating sleeve surrounding the calibrating coil and clips carried by said stud; and a metal protecting sleeve surrounding said insulating sleeve and said bobbin, and being secured to the latter.

6. A resistance thermometer bulb comprising a metal bobbin of high heat conductivity; an electrically insulated heat-responsive coil on said bobbin, having a pair of leads extending therefrom; an elongate metal sleeve surrounding said coil and leads, one end of said sleeve being hermetically sealed to one end of the bobbin; an apertured metal cap hermetically sealed to the other end of the sleeve; a pair of glass bushings hermetically sealed in the apertures of said cap; and a pair of contact pins extending through said glass bushings and hermetically sealed thereto, said pins being electrically connected with the leads from the heat-responsive coil.

7. A resistance thermometer bulb comprising a metal bobbin of high heat conductivity; an electrically insulated heat-responsive coil on said bobbin, having a pair of leads extending therefrom; an elongate metal sleeve surrounding said coil and leads, one end of said sleeve being hermetically sealed to one end of the bobbin; an apertured metal cap hermetically sealed to the other end of the sleeve; the leads from the heat-responsive coil extending through the apertures in the cap; and means for hermetically sealing said leads to the cap so that the interior of the sleeve is isolated from the area surrounding the sleeve.

8. A resistance thermometer bulb comprising a metal bobbin of high heat conductivity; an electrically insulated heat-responsive coil on said bobbin, having a pair of leads extending therefrom; an elongate metal sleeve surrounding said coil and leads, one end of said sleeve being hermetically sealed to one end of the bobbin; an apertured metal cap hermetically sealed to the other end of the sleeve; a pair of glass bushings hermetically sealed in the apertures of said cap; a pair of contact pins extending through said glass bushings and hermetically sealed thereto, said pins being electrically connected with the leads from the heat-responsive coil; and a mounting head surrounding the end of the sleeve which carries the hermetically sealed cap, said head at one end being sealed to the sleeve at a point intermediate the ends of the latter.

9. A resistance thermometer bulb comprising a metal bobbin of high heat conductivity; an electrically insulated heat-responsive coil on said bobbin; a metal stud embedded in the bobbin and extending generally axially from one end thereof; an insulating sleeve on said stud; a calibrating coil wound on said insulating sleeve and series-connected to the heat-responsive coil; a pair of metal connector clips secured to the insulating sleeve; and connections between said clips and the calibrating and heat-responsive coils.

10. A resistance thermometer bulb comprising a metal bobbin of high heat conductivity; an electrically insulated heat-responsive coil on said bobbin; a stainless steel stud embedded in the bobbin and extending generally axially from one end thereof: an insulating sleeve on said stud; a calibrating coil wound on said sleeve and series-connected to the heat-responsive coil; a pair of metal connector clips secured to the insulating sleeve; a pair of leads connected to said clips; an elongate metal sleeve surrounding said coils, clips and leads, one end of said sleeve being hermetically sealed to one end of said bobbin and the other end of said sleeve providing an exit for said leads and being hermetically sealed to the latter; and means including an operable member located near said other end of the sleeve for securing the latter in the well of a support.

11. A resistance thermometer bulb comprising a metal bobbin of high heat conductivity, adapted to engage a heat-transmitting body; an electrically insulated heat-responsive coil on said bobbin; a rigid stud extending generally axially from one end of the bobbin; an electrically insulated calibrating coil wound in the stud and series-connected to the heat-responsive coil; and a lead wire connected with the calibrating coil, one end of the heat-responsive coil being electrically connected to the bobbin to include the latter in the circuit of the coils.

12. A resistance thermometer bulb comprising a bobbin of high heat conductivity adapted to make contact with a heat-imparting body; an elongate metal sleeve at one end secured around the bobbin and making electrical connection thereto, said sleeve having means for securing it to a supporting structure; an electrically insulated heat-responsive coil on said bobbin having one end electrically connected therewith; and a lead wire connected with the other end of the coil and extending through the sleeve for connection in an external circuit.

13. A resistance thermometer bulb comprising a metal bobbin of high heat conductivity; an electrically insulated heat-responsive coil on said bobbin; a stainless steel stud embedded in the bobbin and extending generally axially from one end thereof; an insulating sleeve on said stud; a calibrating coil wound on said insulating sleeve and series-connected to the heat-responsive coil; a pair of metal connector clips secured to the insulating sleeve; and connections between said clips and the calibrating and heat-responsive coils.

KNUD J. KNUDSEN.

REFERENCES CITED

The following references are of record in the file of this patent:

UNITED STATES PATENTS

| Number | Name | Date |
|---|---|---|
| 1,974,187 | Malpass | Sept. 18, 1934 |
| 2,102,030 | Quereau | Dec. 14, 1937 |
| 2,149,448 | Lederer et al. | Mar. 7, 1939 |
| 2,321,846 | Obermaier | June 15, 1943 |